United States Patent

[11] 3,623,830

| [72] | Inventor | Ernest Wildhaber<br>Brighton, N.Y. |
|---|---|---|
| [21] | Appl. No. | 24,484 |
| [22] | Filed | Apr. 1, 1970 |
| [45] | Patented | Nov. 30, 1971 |
| [73] | Assignee | Bird Island, Inc.<br>Boston, Mass. |

[54] ROTOR WITH HELICAL TEETH FOR DISPLACING COMPRESSIBLE FLUID
5 Claims, 8 Drawing Figs.

[52] U.S. Cl............................................. 418/201
[51] Int. Cl.......................................... F01c 1/16,
F04c 1/10, F04c 17/12
[50] Field of Search........................... 418/197,
201, 202, 203

[56] References Cited
UNITED STATES PATENTS

| 3,414,189 | 12/1968 | Persson | 418/201 |
| 3,423,017 | 1/1969 | Schibbye | 418/201 X |
| 2,473,234 | 6/1949 | Whitfield | 418/201 |
| 2,622,787 | 12/1952 | Nilsson | 418/202 X |
| 2,952,216 | 9/1960 | Wildhaber | 418/197 |
| 3,138,110 | 6/1964 | Whitfield | 418/201 |
| 3,245,612 | 4/1966 | Nilsson et al. | 418/201 |

*Primary Examiner*—Carlton R. Croyle
*Assistant Examiner*—John J. Vrablik
*Attorney*—Shlesinger, Fitzsimmons & Shlesinger ABSTRACT: This rotor has helical teeth of concave profile extending principally inside of its cylindrical pitch surface. Said profile is tangent to the root surface of the teeth. The pitch point (0, FIG. 2) radially in line with the point (33) of tangency has a larger distance (0-37) from the outer end of the profile than (0-33) from the root circle, on one side of the teeth. The increase is at least 10 percent of the distance (0-33) from the root circle. Said profile is preferably a circular arc in sections normal to the teeth.

PATENTED NOV 30 1971

3,623,830

INVENTOR:
Ernest Wildhaber

ROTOR WITH HELICAL TEETH FOR DISPLACING COMPRESSIBLE FLUID

The present invention relates to rotors with helical teeth for displacing compressible fluid, such as for instance air, gases, vapors. A pair of rotors mounted on parallel axes run together inside of bores of a housing to displace fluid principally in axial direction. As they do so, a pair of imagined cylindrical surfaces coaxial and rigid with the rotors roll together without sliding. These are the pitch surfaces. They define the relative motion.

One of the rotors has helical teeth of convex profile that extends principally outside of its pitch surface. The other rotor has helical teeth lying principally inside of its pitch surface. It has concave tooth profiles. The two rotors may be referred to as male and female rotors. The specification describes particularly the rotor with concave profiles, the female rotor. Its shape also determines the shape of the male rotor mating therewith. It is such that the uniform-motion mesh covers the entire tooth profile of the female rotor, including its root portion and its outside end portion. This conjugacy is known art. Suitable small clearance is provided in accordance therewith.

The rotor pair is known to form compartments which are displaced axially on rotation of the rotors. To achieve a change in volume of a compartment, compression in a compressor, expansion in a motor, free axial passage is blocked by stationary portions until the required fluid density is reached. The compartments under pressure are separated from other compartments by contact lines or near-contact lines between the rotors and by contact or near-contact zones with the bores of the housing. Both of them will be referred to as sealing lines.

One object of the invention is to shorten the sealing lines, thereby to reduce fluid escape. A further aim is to simplify the tooth shape for easier manufacture and checking.

A further object is to provide a tooth shape enabling the male rotor to drive the female rotor without timing gears, at least for moderate or small sizes, by providing a tooth shape with intimate tooth contact and reduced profile sliding.

Other objects will appear in the course of the specification and in the recital of the appended claims.

The invention will be described with the drawing, in which

Rotor pairs for compressible fluids differ from rotor pairs for conventional liquids, that are practically incompressible: Stationary portions (60, FIG. 8) are provided that block passage of fluid until the required compression or density is reached. Such portions are needed with compressible fluids. They make it possible to provide asymmetrical profiles on opposite sides of the teeth without loss of volumetric efficiency. These permit shortening the sealing lines on the side under driving pressure, and providing there tooth surfaces meshing with tangential contact rather than with edge contact. These tooth surfaces may occupy the full depth of the teeth. Contact under low specific pressure is important especially when timing gears are omitted.

Figure 1:
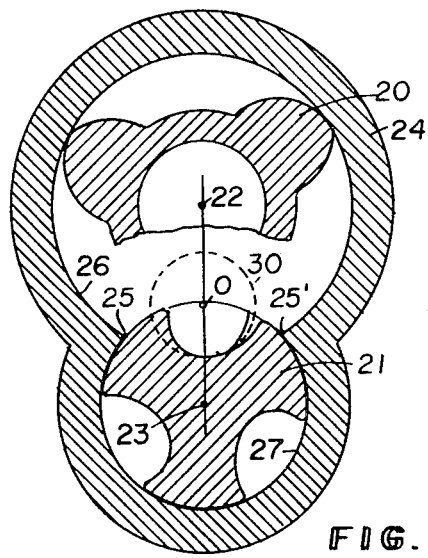
FIG. 1 is a cross section of a rotor pair and their housing, taken midway between the ends of the rotors.

The male rotor 20 (FIG. 1) and the female rotor 21 in the engagement therewith turn on axes 22, 23 in a housing 24, inside the cylindrical bores 26, 27 thereof. The bores intersect along lines 25, 25'. Pitch point 0 is the contact point of pitch circle 28 (FIG. 2) of the female rotor 21 with the pitch circle of the male rotor 20.

The profile 29 provided in accordance with the invention extends outside of the circular profile 30 drawn about a center 0. It touches the circle 30 at its point of tangency 33 with the root circle 34. Pitch point 0 is radially in line with point 33 which represents the juncture of profile 29 and root circle 34. Both points 0 and 33 lie on the same radius 0–23. Pitch point 0 has a distance 0–37 from the outside end 37 of profile 29. This distance is larger than its distance 0–33 from the root circle, at least 10 percent of 0–33 larger.

The invention uses on this side preferably tooth surfaces basically envelopable by a sphere centered at 0, a sphere that moves along the helix passing through pitch point 0. Circle 30 is a great circle of this sphere that contacts the tooth surface along a circular arc whose plane is perpendicular to the helix at 0. This is also the contact line between mating tooth surfaces. Thus the tooth surface has a circular profile 32 in normal section. It appears as an ellipse in the axial view of FIG. 2. Its true circular shape shows up in FIG. 3 that is a section perpendicular to the helix at 0.

Figure 2:
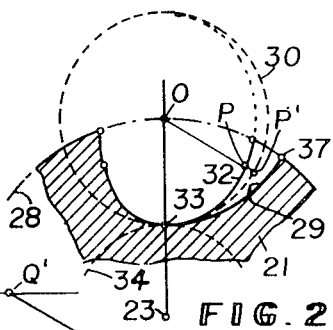
FIG. 2 is a fragmentary enlarged cross section of the working portion of the female rotor shown in FIG. 1, taken at right angles to the rotor axis.

Prior art shows a circular profile 30 in planes at right angles to the rotor axis 23, in the drawing plane of FIG. 2. Tooth contact between the rotors then is along this profile 30.

Figure 3:
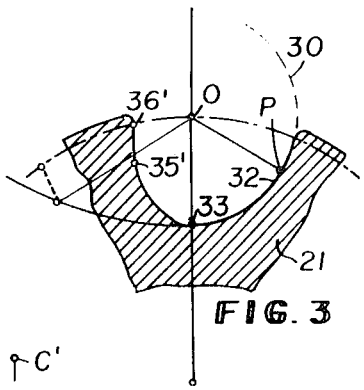
FIG. 3 is a fragmentary section similar to FIG. 2, but taken at right angles to the teeth, and referred to as a normal section.

The invention provides several improvements. Consider any point P of the projected contact profile 32 (FIG. 2) and compare it with a point P' of circular contact profile 30, points P and P' being at the same distance from axis 23. Tooth sliding is proportional to the distances OP and OP'. It is smaller for profile 32. The outside end of profile 29 is less hooked than that of profile 30; that is its negative profile angle is decreased. At last, but not least, the invention provides a simpler shape that can be easily and accurately checked and that can be produced for instance with a milling cutter or grinding wheel of circular profile that is identical with profile 32, (FIG. 3). For circular profiles in planes perpendicular to the rotor axis this cutter profile is not a simple circular arc.

Basically the mating tooth side of the male rotor contains the same circular profile 32 in normal section as a convex arc, as far as it is in contact with the matching profile of rotor 21. From the end point of this contact to the root surface, the tooth shape of the male rotor is such as is described or enveloped by the helical outside edge or rounded outside end of the female rotor, as the two rotors run together.

Conventional slight departures may be made from the basic shape of full mathematical conjugacy. Thus the radius of concave arc 32 is preferably made slightly larger than the radius of the convex arc of the male rotor. The arc centers of the two rotors then lie on the mean profile normal, slightly off pitch point 0.

The driving pressure is not absolutely constant but varies cyclically with each tooth engagement, to some extent. For this reason it is desirable to equip the trailing side with tooth surfaces capable of transmitting some torque with tangential contact. Preferably I use on the trailing side a design described in my U.S. Pat. No. 2,952,216 granted Sept. 13, 1960. The trailing side then contains a circular profile 35'–36', (FIG. 3), in normal section, that occupies only a portion adjacent the outside end of the teeth. From point 35' down to the tooth bottom the tooth surface is such as is described by the helical outside edge of the mating tooth of the male rotor.

Figure 4:
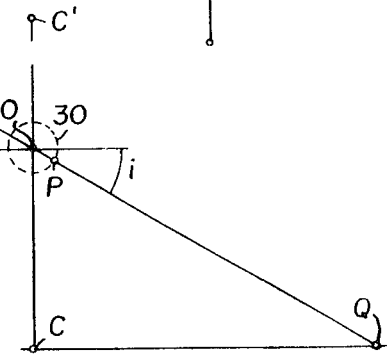
FIG. 4 is a diagrammatic normal section like FIG. 3 but at a small scale, illustrating the curvature centers in a plane containing the helix tangent at pitch point 0.

In the small-scale normal section shown in FIG. 4 OC and OC' are the curvature radii of the mating helices that pass through pitch point 0. Curvature radius OC' is here equal to OC. It amounts to the pitch radius $r$ divided by the square of the sine of the helix angle $h$ at 0, $r/\sin^2 h$.

Figure 5:
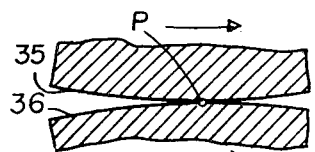
FIG. 5 is such a plane section. It is shown at the scale of FIG. 1.
Figure 6:
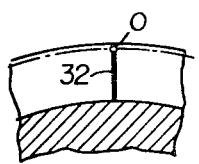
FIG. 6 is a fragmentary normal view of a tooth side of the female rotor, showing the working portion and the contact line with its mate.

The tooth surface of the female rotor has the same curvature as a surface of revolution with axis CQ parallel to the pitch plane and having the same profile 32. The tooth surface of the male rotor is curved adjacent normal OP like a surface of revolution whose axis passes through Q' and is parallel to the pitch plane. Q and Q' are the curvature centers of the intersection curves 35, 36 shown in FIG. 5, except for scale. The intersection plane contains the helix tangent at 0 and the surface normal P0. PQ and PQ' are the curvature radii. It is seen that OQ=OC/sin $i$, where $i$ is the inclination angle of the surface normal to the pitch plane, (FIG. 3). As the curvature radii are quite large the surfaces have intimate tooth contact.

On the male rotor the tooth surface with circular profile in normal section is identical with a portion of the outside surface of a helical pipe of circular cross section, whose centerline is a helix of constant lead. The tooth surface of the mating female rotor is identical with a portion of the inside surface of a helical pipe.

Mating helical tooth surfaces roll together lengthwise while some sliding is added, chiefly in the direction of the profile. The medium is drawn by friction into the wedge 35, 36 at the left of FIG. 5, so that pressure is built up and direct metal-to-metal contact is avoided.

Any suitable numbers of teeth may be used on the rotors, either equal numbers on both rotors, or unequal numbers with more teeth on the female rotor.

THE SEALING LINES

They will be described with FIGS. 7 and 8 for profiles 32 on the drive side and first for profiles on the trailing side without the circular-arc portion 35'–36'. In the compressor, rotor 21 is considered moving in the direction of arrow 37 with respect to stationary portion 60, so that the pressure side is below in FIGS. 7 and 8. In FIG. 8 the distance between the positions 23 and 23' of the projected axis equals the circumference of the cylindrical pitch surface. The showings at 23 and 23' are repetitions of each other.

In FIG. 2 the profiles of opposite tooth sides are shown joining each other directly at point 33, which is a point of the root circle 34. The root surface is the surface of revolution about the rotor axis 23, that contains the helix passing through point 33. This helix appears as a thin straight line 51 in the development FIG. 8. The tooth spaces are characterized by the lines 51. Dotted lines 46 represent the sealing lines with housing 24. The teeth are characterized by the presence of sealing lines 46. These start at the intersection lines 25, 25' (FIG. 1) of the bores 26, 27, at a distance from the projected axis 23' or 23.

If desired, a circular-arc portion about axis 23 may be provided between root point 33 of profile 29 and the start of the trailing profile, (FIG. 2).

Portion 40–41 of the sealing line extends along the helical outside edge or end 50 of a tooth of the female rotor. Between 41 and 42 it extends along the helical outside edge of the male rotor to root helix 51. Between 42 and 43 it follows the circular contact line 32. From 43 to 44 it follows the helical outside edge or end 50' on the adjacent tooth of the female rotor. Between 44 and 40' it follows the contact line between the cylindrical outside surface of the female rotor 21 and the cylindrical root surface of the male rotor 20. It continues along broken line 40'–41'–43'–44' that is an axially displaced repetition of line 40–41–42–43–44.

Figure 7:
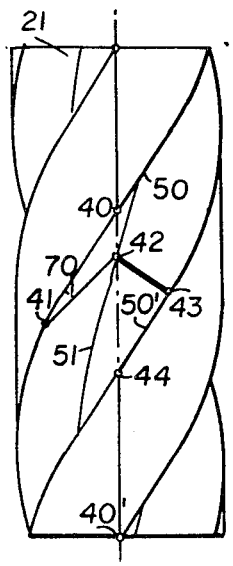
FIG. 7 is a side view of the toothed portion of the female rotor, showing also the sealing lines with the male rotor.
Figure 8:
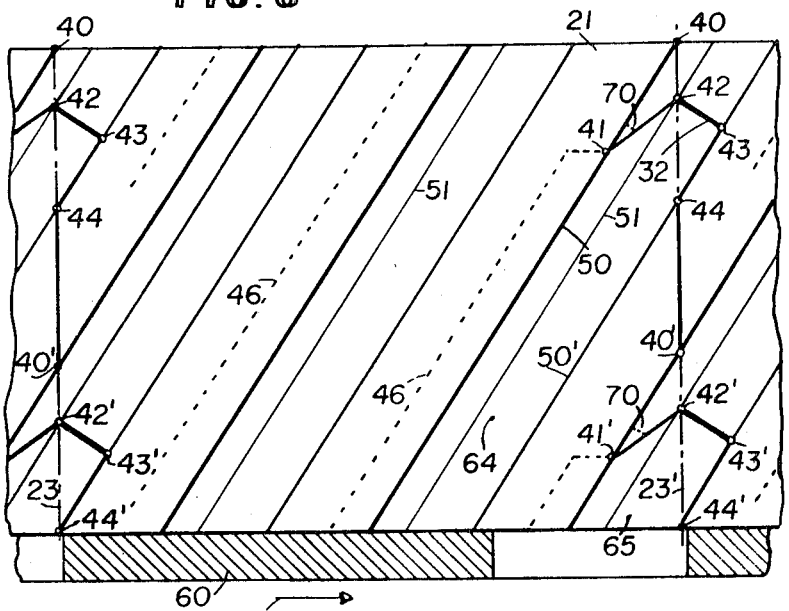
FIG. 8 is a development to a plane of the pitch surface of the female rotor and of its helical teeth, showing the sealing lines with the male rotor and with the housing.

The described sealing lines also appear in FIG. 7.

When the trailing profile contains the circular-arc portions 35'–36α⅔ ,fig. 3) the corners at points 41, 41' of the sealing line are bridged by portions 70 shown dotted.

Compression has started in space 64. Space 65 is near the end of delivery.

The housing, with its inlet and outlet ducts is formed according to known art.

For definition of the scope of the invention reliance is had on the appended claims.

I claim:

1. A rotor with helical teeth for displacing compressible fluid,
    having an outside surface adjacent its pitch surface and containing teeth of concave profile in planes perpendicular to the rotor axis,
    said profiles extending to the root circle of the teeth,
    the pitch point radially in line with the juncture of a profile and the root circle being closer to the root circle than to the outside end of said profile on one side of the teeth,
    the tooth surfaces on that side having circular arc profiles in planes normal to said tooth side.
2. A rotor according to claim 1, whereon
    said profile is tangent to the root circle,
    the distance of said pitch point from the outside end of said profile exceeds its distance from the root circle by at least 10 percent.
3. A rotor according to claim 1, whereon
    on one side of the teeth said circular profile reaches all the way to the root surface while on the opposite side it occupies only a portion adjacent the outside end of the teeth.
4. A pair of rotors comprising a rotor according to claim 1 and a mating rotor adapted to mesh with the first-named rotor along the entire tooth profile including its root portion and its outside portion.
5. A pair of rotors according to claim 4, whereon
    both rotors contain tooth surfaces of circular profile in planes normal to the helical tooth sides.

* * * * *